(12) United States Patent
Stojanovski (10) Patent No.: US 9,992,806 B2
(45) Date of Patent: Jun. 5, 2018

(54) PUBLIC SAFETY DISCOVERY AND COMMUNICATION USING A UE-TO-UE RELAY

(71) Applicant: Intel IP Corporation, Santa Clara, CA (US)

(72) Inventor: Alexandre Stojanovski, Paris (FR)

(73) Assignee: Intel IP Corporation, Santa Clara, CA (US)

( * ) Notice: Subject to any disclaimer, the term of this patent is extended or adjusted under 35 U.S.C. 154(b) by 259 days.

(21) Appl. No.: 14/812,833

(22) Filed: Jul. 29, 2015

(65) Prior Publication Data

US 2016/0212780 A1  Jul. 21, 2016

Related U.S. Application Data

(60) Provisional application No. 62/103,754, filed on Jan. 15, 2015.

(51) Int. Cl.
*H04W 4/00* (2018.01)
*H04W 76/02* (2009.01)
*H04W 8/00* (2009.01)
*H04W 88/04* (2009.01)

(52) U.S. Cl.
CPC ......... *H04W 76/023* (2013.01); *H04W 8/005* (2013.01); *H04W 88/04* (2013.01)

(58) Field of Classification Search
CPC .............................. H04W 76/023; H04W 88/04
USPC .......................................................... 370/315
See application file for complete search history.

(56) References Cited

U.S. PATENT DOCUMENTS

| | | | |
|---|---|---|---|
| 9,713,072 B2 * | 7/2017 | Liao ...................... | H04W 4/008 |
| 2014/0112162 A1 | 4/2014 | Tavildar et al. | |
| 2014/0241262 A1 * | 8/2014 | Novak ................ | H04W 72/042 370/329 |
| 2015/0029866 A1 * | 1/2015 | Liao ...................... | H04W 4/008 370/241 |
| 2015/0334555 A1 * | 11/2015 | Seo ........................ | H04W 84/18 370/254 |
| 2016/0157080 A1 * | 6/2016 | Agiwal ................. | H04W 8/005 370/328 |
| 2016/0212682 A1 * | 7/2016 | Chung ................... | H04W 12/06 |
| 2016/0219541 A1 * | 7/2016 | Chatterjee ......... | H04W 36/0055 |
| 2016/0234806 A1 * | 8/2016 | Le Thierry D'Ennequin ........... | H04W 4/06 |
| 2016/0302052 A1 * | 10/2016 | Xu ........................ | H04W 8/005 |

(Continued)

OTHER PUBLICATIONS

3GPP, "Technical Specification Group Services and System Aspects; Study on extended architecture support for Proximity-based services (Release 13)," 3GPP TR 23.713 V0.3.0 (Nov. 2014), LTE Advanced, 40 pages.

(Continued)

*Primary Examiner* — Farah Faroul
(74) *Attorney, Agent, or Firm* — Schwabe, Williamson & Wyatt, P. C.

(57) ABSTRACT

Embodiments of the present disclosure describe apparatuses for public safety discovery and communication with a user equipment (UE)-to-UE relay. Various embodiments may include processing circuitry to execute instructions to determine a list of UEs with which an apparatus may communicate using device-to-device (D2D) communication and generate an announcement message that indicates the apparatus can serve as a relay based at least in part on the list. Other embodiments may be described and/or claimed.

24 Claims, 6 Drawing Sheets

(56) References Cited

U.S. PATENT DOCUMENTS

2017/0105111 A1* 4/2017 Li .................. H04W 72/04
2017/0223753 A1* 8/2017 Hoglund ............ H04W 76/02

OTHER PUBLICATIONS

3GPP, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.4.0 (Dec. 2014), LTE Advanced, 251 pages.
International Search Report and Written Opinion dated Apr. 7, 2016 for International Application No. PCT/US2015/064467; 15 pages.
3GPP TS 23.303 V12.2.0 (Sep. 2014); Technical Specification Group Services and System Aspects; Proximity-based services (ProSe); Stage 2 (Release 12); 62 pages.

* cited by examiner

PUBLIC SAFETY DISCOVERY AND COMMUNICATION USING A UE-TO-UE RELAY

CROSS REFERENCE TO RELATED APPLICATIONS

The present application claims priority to U.S. Provisional Patent Application No. 62/103,754, filed Jan. 15, 2015, entitled "PUBLIC SAFETY DISCOVERY AND COMMUNICATION USING A UE-TO-UE RELAY," the entire disclosure of which is hereby incorporated by reference in its entirety for all purposes, except for those sections, if any, that are inconsistent with this specification.

FIELD

Embodiments of the present disclosure generally relate to the field of wireless communication, and more particularly, to apparatuses and methods for enabling public safety device-to-device (D2D) functionality.

BACKGROUND

The background description provided herein is for generally presenting the context of the disclosure. Unless otherwise indicated herein, the materials described in this section are not prior art to the claims in this application and are not admitted to be prior art or suggestions of the prior art, by inclusion in this section.

D2D applications may provide a scalable and universal framework for connecting proximity peers. There are different technology solutions for D2D applications, e.g., based on WiFi Direct or Near Field Communication (NFC) technology. D2D functionality relating to the 3rd Generation Partnership Project (3GPP) may also be provided by Proximity Services (ProSe) or Long-Term Evolution (LTE) Direct. In some situations, it may be desirable for members of a group such as public safety users to communicate directly in a D2D, user equipment (UE) to UE fashion. However, a sending UE may not always be in range of a receiving UE.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
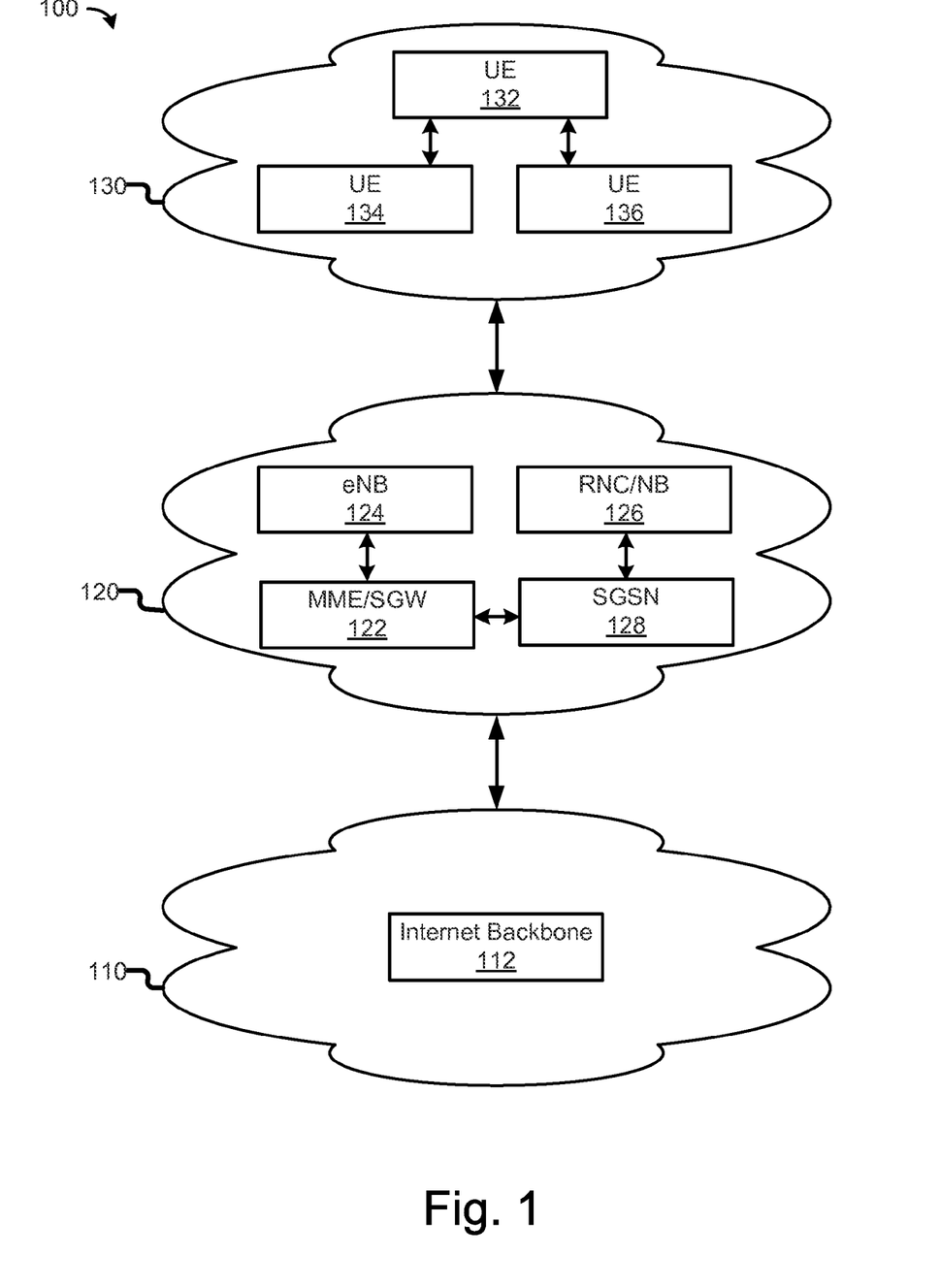
FIG. 1 schematically illustrates a wireless communication system in accordance with various embodiments.

FIG. 1 schematically illustrates a wireless communication system 100 that incorporates the public safety discovery and communication using a UE-to-UE relay teaching of the present disclosure, in accordance with various embodiments. The wireless communication system 100 may include a backbone network 110, a cellular mobile network 120, and a D2D network 130. The D2D network 130 may include UEs 132, 134, and 136 which may also communicate using the cellular mobile network 120.

The backbone network 110 may be a part of computer network infrastructure that interconnects various sub-networks and provides a path for the exchange of information between these sub-networks. In various embodiments, the backbone network 110 may include Internet backbone 112, which may include the principal data routes between large, strategically interconnected computer networks and core routers on the Internet.

The cellular mobile network 120 may be in data communication with the backbone network 110. In various embodiments, the cellular mobile network 120 may include one or more radio access networks, such as a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. In some embodiments, a radio access network may include GSM Enhanced Data rates for GSM Evolution (EDGE) Radio Access Network (GERAN), Universal Terrestrial Radio Access Network (UTRAN), or Evolved UTRAN (E-UTRAN). The cellular mobile network 120 may operate in accordance with other network technologies in other embodiments.

Mobile communication technology may rely on various standards and protocols to transmit data between a base station and a wireless communication device. Wireless communication system standards and protocols may include, for example, the 3GPP LTE; the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In a 3GPP radio access network (RAN), according to LTE, the base station may be referred to as an evolved Node B (also commonly denoted as eNodeB, or eNB). It may communicate with a wireless communication device, known as user equipment (UE). Although the present disclosure is presented with terminology and examples generally directed toward 3GPP systems and standards, the teaching disclosed herein may be applied to any type of wireless network or communication standard.

In various embodiments, the cellular mobile network 120 may include eNB 124, radio network controller (RNC) and legacy node B (NB) 126, mobility management entities (MME) and serving gateways (SGW) 122, and serving GPRS support nodes (SGSN) 128. eNB 124 may include more functionality than legacy NB 126, which may be used in a 3G network such as a UMTS network. For example, RNC functionality may be located in eNB 124 rather than being in a separate RNC entity. In LTE, eNB 124 may connect to another eNB by means of an X2 interface that allows the eNBs to forward or share information. In some embodiments, the cellular mobile network 120 may be an Internet Protocol (IP) based network, wherein interfaces between network entities (e.g., eNB 124 and MME/SGW 122) may be based on IP. In some embodiments, MME/SGW 122 may communicate with eNB 124 over an S1 interface. The S1 interface may be similar to the S1 interface as defined in 3GPP Technical Specification (TS) 36.410 V11.1.0 (2013-09) and may support a many-to-many relation between MME/SGW 122 and eNB 124. For example, different operators may simultaneously operate the same eNB in a network sharing setting. In some embodiments, communication between the eNB 124 and UEs may be facilitated via the MME/SGW 122. The MME/SGW 122 may be configured to manage signaling exchanges, e.g., authentication of a UE, such as the UE 132, or perform other actions associated with establishment of a communication link to establish a connected mode of the UE 132 with the cellular mobile network 120. In some embodiments, the MME/SGW 122 may be responsible for tracking and paging user equipment, e.g., when the UE 132 is in an idle mode.

For ease of illustration, various descriptions herein are provided to conform to 3GPP in the communication system 100; however, the subject matter of the present disclosure is not limited in this regard and the embodiments disclosed herein may be advantageously applied to other wired or wireless communication protocols or networks. For example, in an embodiment in which the cellular mobile network 120 includes a UTRAN, the eNB 124 may represent a radio network controller (RNC) configured to communicate with the UEs 132, 134, or 136 (discussed in additional detail below) via a NB. In an embodiment where the cellular mobile network 120 includes a GERAN, the eNB 124 may represent a base station controller (BSC) configured to communicate with the UEs 132, 134, or 136 via a base transmission station (BTS).

In various embodiments, the UE 132 may access the cellular mobile network 120 via a radio link with one of the base stations, e.g., eNB 124. A downlink (DL) transmission may be a communication from the eNB 124 to the UE 132. An uplink (UL) transmission may be a communication from the UE 132 to the eNB 124. Only limited numbers of UEs and eNBs are illustrated in FIG. 1 for ease of illustration. However, the communication system 100 may include any number of UEs, eNBs, or other servers while practicing suitable embodiments of the present disclosure. As an example, in some embodiments, the cellular mobile network 120 may also include other servers, such as a machine type communication (MTC) server (not shown) to facilitate MTC.

In some embodiments, the UE 134 may be configured to communicate with another machine. Data may be transmitted from the UE 134 to another machine or received by the UE 134 from another machine with the need for little or no human interaction. For example, the UE 134 may be a sensor that is electrically coupled to a wireless transceiver (e.g., the transceiver circuitry 224, discussed below with reference to FIG. 2), and may be configured to communicate, with little or no intervention, with another machine (e.g., another sensor). In some embodiments, the wireless transceiver of the UE 134 may also be configured to communicate with at least one of a wireless metropolitan area network (WMAN), a wireless local area network (WLAN), or a wireless personal area network (WPAN).

In some embodiments, the UE 136 may be a mobile communication device, a subscriber station, or another device that is configured to communicate with the cellular mobile network 120, e.g., via the eNB 124, in conformance with an appropriate protocol (e.g., a multiple-input/multiple-output (MIMO) communication scheme). As discussed in further detail below, the UEs, 132, 134, and/or 136 may be configured to enable D2D functionality. In embodiments, D2D functionality may also be referred to as sidelink direct communication (SL).

In various embodiments, UE 132, UE 134, and UE 136 may form a D2D network 130. In the D2D network 130, two UEs in proximity may directly communicate without having the communications routed through eNB 124 or any other base stations and cellular mobile networks. Direct communication between devices is commonly known as D2D communication or peer-to-peer (P2P) communication. In various embodiments, D2D communication may be established directly by UEs or may be at least partially facilitated by an eNB.

D2D operation in the D2D network 130 may be non-transparent to the cellular mobile network 120 and may occur on a cellular spectrum (for example, inband) or unlicensed spectrum (for example, outband). D2D operation in the D2D network 130 may be realized in different communication technologies. In some embodiments, short-range technologies, such as Bluetooth or Wi-Fi may be used. In some embodiments, D2D operation may reuse licensed LTE spectrum or unlicensed LTE spectrum.

In various embodiments, D2D operation in the D2D network 130 may include device discovery, whereby UEs are to determine whether they are within range and/or available for D2D operation before establishing a D2D session. Proximity detection may be assisted by the cellular mobile network 120, may be performed at least partially by UEs, or may be performed largely by UEs independently.

In various embodiments, D2D discovery may be closed D2D discovery or open D2D discovery. Closed D2D discovery may apply to use cases wherein a discoverable device may be discovered only by a select set of D2D-enabled discovering devices. For example, only pre-identified or selected devices may be allowed to connect, such as devices identified or selected by the cellular mobile network 120, a D2D server (not shown), an application (not shown), or a user (not shown). Thus, for this use case, a discovering device would be assumed to know, in advance, the D2D-enabled devices it wishes to discover in its proximity, including any corresponding identifiers.

On the other hand, open device discovery considers use cases wherein a discoverable device may want itself to be discovered by any or all D2D-enabled devices in its proximity. From the perspective of the discovering device, open device discovery implies that a discovering device may not be aware of the identity of other D2D enabled devices prior to discovery. Consequently, the device discovery mechanism for open discovery may aim toward discovering as many D2D-enabled devices in its proximity as possible.

In certain situations, such as for open D2D discovery using licensed resources, an eNB may have limited control of the discovery process among UEs. In particular, an eNB may periodically allocate certain discovery resources in the form of D2D discovery regions (e.g., time/frequency resources such as resource blocks or subframes) for UEs to transmit the discovery information. The discovery information may be in the form of a discovery sequence or discovery packet with payload information.

In various embodiments, D2D operation in the D2D network 130 may improve spectrum utilization, increase network throughput, reduce transmission delay, offload traffic for eNB 124, and alleviate congestion in the cellular mobile network 120. In this regard, D2D operation may have a wide variety of applications. For example, D2D network 130 may be used for local social networks, content sharing, location-based marketing, service advertisements, mobile-to-mobile applications, etc. In embodiments, the D2D network 130 may serve as a fallback public safety network that may function even when the cellular mobile network 120 becomes unavailable or fails.

In various embodiments, some of the UEs in the D2D network 130 may be located in relation to other UEs in the D2D network 130 such that they can communicate with some of the UEs and not others. In embodiments, the UE 132, UE 134, and UE 136 may all be members of a public safety group, but UE 134 may be located at a distance from UE 136 such that UE 134 and UE 136 cannot directly communicate with each other in a D2D, sidelink fashion. However, each of UE 134 and UE 136 may be able to communicate using D2D communication with UE 132 such that UE 132 may act as a UE relay for D2D communication between UE 134 and UE 136 using UE 132 as a relay UE.

Figure 2:
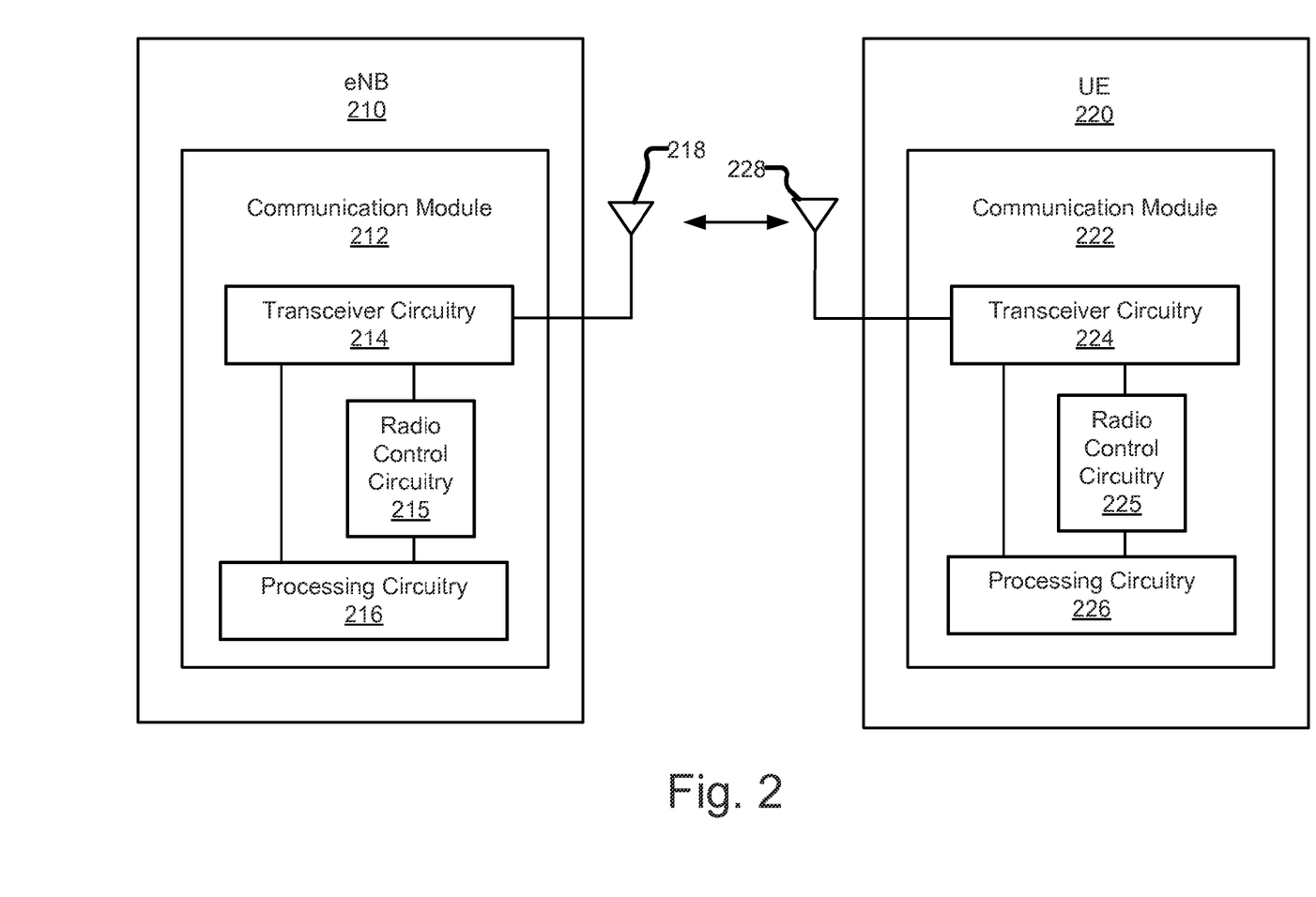
FIG. 2 is a schematic block diagram illustrating components of an evolved node B (eNB) and a UE in accordance with various embodiments.

FIG. 2 is a schematic block diagram illustrating components of an eNB 210 and a UE 220 in a wireless communication environment that incorporate the public safety discovery and communication using a UE-to-UE relay teaching of the present disclosure in accordance with various embodiments. The eNB 210 may be similar to, and substantially interchangeable with eNB 124 of FIG. 1. In embodiments, the eNB 210 may include one or more antennas 218 and a communication module 212. In various embodiments, transceiver circuitry 214, radio control circuitry 215, and processing circuitry 216 within the communication module 212 may be coupled with each other as shown. Likewise, the UE 220 may be similar to, and substantially interchangeable with UE 132, 134, or 136 of FIG. 1. In embodiments, the UE 220 may include one or more antennas 228 and a communication module 222. In various embodiments, transceiver circuitry 224, radio control circuitry 225, and processing circuitry 226 within the communication module 222 may be coupled with each other as shown.

The transceiver circuitry 214 may be coupled with the antennas 218 to facilitate over-the-air communication of signals to and from the eNB 210. Operations of the transceiver circuitry 214 may include, but are not limited to, filtering, amplifying, storing, switching, etc. In various embodiments, the transceiver circuitry 214 may be configured to provide various signal processing operations on the signal to the antennas 218 with appropriate characteristics. In some embodiments, the transceiver circuitry 214 may be configured to communicate with UEs that have D2D operation capabilities. The transceiver circuitry 214 may be configured to receive signals from the antennas 218 for transmission to other components of the eNB 210 and/or for internal processing by the processing circuitry 216.

The processing circuitry 216 may generate configuration and control information to UEs of a serving cell, e.g., UE 220, and generate signals to transmit the configuration and control information to the UEs via the transceiver circuitry 214. The configuration and control information may include, for example, downlink channel information, downlink control information (DCI), radio resource control (RRC) configuration information, etc. In some embodiments, such configuration and control information may include a SIB message to activate at least one of D2D discovery, D2D communication, or D2D relay functionality of the UE 220. In various embodiments, the processing circuitry 216 may generate different types of SIB messages for UE 220. As an example, processing circuitry 216 may generate a first-type SIB message for primary notification, followed by a second-type SIB message for secondary notification with authorization or configuration information for D2D operation. In various embodiments, the secondary notification to UE 220 may include information for preferred frequency spectrum for D2D operation, information for D2D synchronization source set-up, a public safety alert, or a public safety release message.

In various embodiments, processing circuitry 216 may generate the aforementioned SIB messages for numerous selected UEs in an alert region, for example, to build the D2D network 130 of FIG. 1. In some embodiments, communication module 212 may send the first-type SIB message with primary notification via Paging. A paging message may be used to communicate with UEs in RRC_IDLE as well as in RRC_CONNECTED modes. In some embodiments, communication module 212 may send the second-type SIB message with secondary notification via Cell Broadcast Service (CBS).

Similar to the communication module 212, the communication module 222 may be coupled with the antennas 228 to facilitate over-the-air communication of signals between UE 220 and eNB 210 or between UE 220 and another UE. For example, the transceiver circuitry 224 may be configured to provide various signal processing operations on the signal to the antennas 228 with suitable characteristics. In various embodiments, operations of the transceiver circuitry 224 may include, but are not limited to, filtering, amplifying, storing, switching, etc. The transceiver circuitry 224 may be configured to receive signals from the antennas 218, and then transmit the signals to other components of the UE 220 and/or for internal processing by the processing circuitry 226.

In some embodiments, the communication module 222 may be configured to receive the primary notification in a Paging Type 1 message if the UE 220 is in an RRC_IDLE state. In some embodiments, the communication module 222 may be configured to receive the primary notification in a System Information Change Indication (SICI) message if the UE is in an RRC_CONNECTED state. In some embodiments, the processing circuitry 226 may, in response to the primary notification, configure the communication module 222 to receive one or more cell broadcast messages containing one or more secondary notifications with authorization or configuration information for D2D operation. In some embodiments, the communication module 222 may receive the one or more cell broadcast messages and, based at least in part on information contained in the secondary notifications, UE 220 may be properly configured for D2D operation, such as with preferred spectrums for D2D operation or proper D2D synchronization sources.

In some embodiments, the UE 220 may include one or more antennas 228 to concurrently utilize radio resources of multiple respective component carriers. The UE 220 may be configured to communicate using Orthogonal Frequency Division Multiple Access (OFDMA) (in, e.g., downlink communications) and/or Single-Carrier Frequency Division Multiple Access (SC-FDMA) (in, e.g., uplink communications). In some embodiments, the UE 220 may use the transceiver circuitry 224 to communicate with another UE via LTE ProSe or LTE Direct.

In some embodiments, communication module 222 may be configured to provide communication services for one or more subscriber identity modules (SIMs) (not shown) with which it may be coupled. In some embodiments, the SIMs may be removably coupled with the communication module 222. In other embodiments, the SIMs may be hardware and/or firmware that are permanently coupled with the UE 220. In various embodiments, the SIMs may include universal integrated circuit cards (UICCs), full-size SIMs, mini-SIMs, micro-SIMs, nano-SIMs, embedded SIMs, and/ or virtual SIMs. In some embodiments, the one or more SIMs may store upper layer user information that may be sent by a UE coupled with the SIM in a communication message to other UEs.

The SIMs may be integrated circuits that securely store subscriber identity information such as international mobile subscriber identity (IMSI) and related keys used to identify and authenticate one or more subscribers using the UE 220. Each SIM may be associated with different subscriber identity information and/or other user information and may or may not be associated with different carriers. In various embodiments, IMSI and related information may be used to facilitate D2D discovery and D2D operation.

Figure 5:
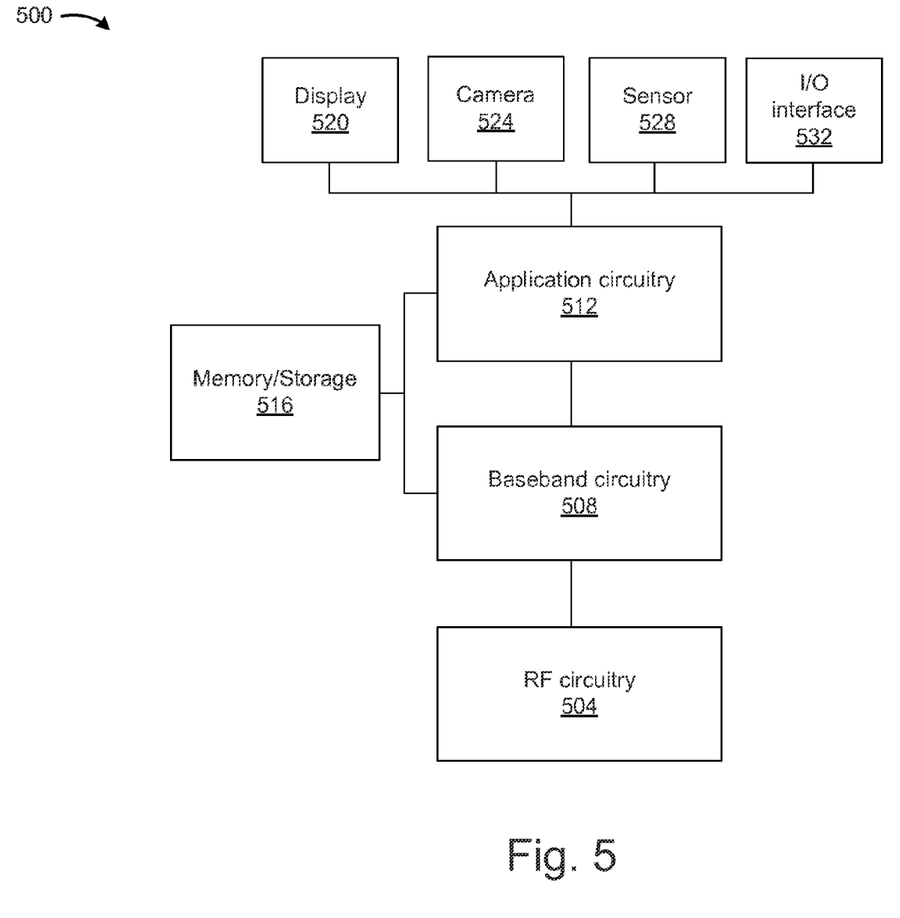
FIG. 5 is a block diagram of an example computing device that may be used to practice various embodiments described herein.

Some or all of the transceiver circuitry 224 and/or processing circuitry 226 may be included in, for example, radio frequency (RF) circuitry or baseband circuitry as described below with respect to FIG. 5. In various embodiments the UE 220 may be, may include, or may be included in a single sensor device, a cellular telephone, a personal computer (PC), a notebook, an ultrabook, a netbook, a smartphone, an ultra mobile PC (UMPC), a handheld mobile device, a UICC, a personal digital assistant (PDA), a Customer Premise Equipment (CPE), a tablet computing device, or other consumer electronics such as MP3 players, digital cameras, and the like. In some embodiments, the UE may include a mobile station, as defined by IEEE 802.16e (2005 or 802.16m (2009) or some other revision of the IEEE 802.16 standard, or user equipment, as defined by 3GPP LTE Release 8 (2008), Release 9 (2009), Release 10 (2011), Release 12 (2014), Release 13 (under development) or some other revision or release of the 3GPP LTE standards.

Figure 3:
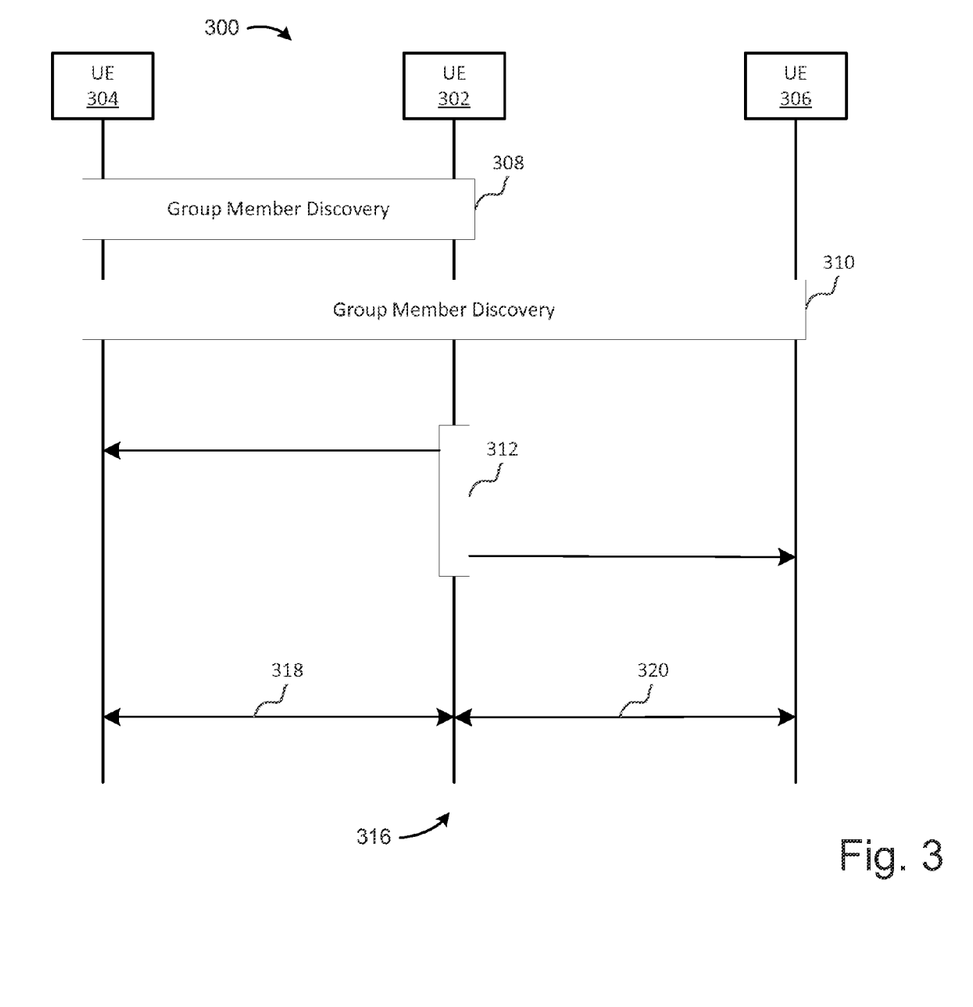
FIG. 3 is a diagram illustrating an example UE-to-UE relay discovery and communication process using Model A (Announce/Monitor) in accordance with various embodiments.

FIG. 3 is a diagram illustrating an example UE-to-UE relay discovery and communication process 300 using Model A (Announce/Monitor). In embodiments, a UE 302, a UE 304, and a UE 306 may each perform group member discovery using Model A or Model B (Discoverer/Discoveree) before performing UE-to-UE relay discovery using Model A. In various embodiments, the UEs 302, 304, and 306 may be similar to and substantially interchangeable with UEs 132, 134, and 136, respectively, of FIG. 1. The UEs 302, 304, and 306 may be configured as described with respect to UE 220 of FIG. 2. In some embodiments, the group member discovery using Model A or Model B may be performed using a method described in 3GPP technical report (TR) 23.713 (release 13, version 0.3.0, 2014) and/or may be carried using D2D discovery or D2D communication capability described in 3GPP technical specification (TS) 36.300 (release 12, version 12.4.0, 2014). With Model A group member discovery, each UE may act as an announcing UE to send a message with a type parameter set to announcement, a discovery-type parameter set to group member discovery, an announcer information parameter that may be set to include upper layer information relating to a user associated with the announcing UE (e.g., an IMSI, mobile subscriber identification number (MSIN) or other information such as may be stored on a UICC in the announcing UE, for example), and a ProSe UE ID parameter that may be set to the ProSe UE ID of the announcing UE. The ProSe UE ID may be a link layer identifier used for direct communication in some embodiments. The announcement message may be periodically broadcast by the announcing UE in various embodiments. If another UE, acting as a monitoring UE, receives the message from the announcing UE, it may determine that it can engage in D2D communication with the announcing UE.

With Model B group member discovery, each UE may act as a discoverer UE to send a message with a type parameter set to solicitation, a discovery-type parameter set to group member discovery, a discoveree information parameter that may be set to include upper layer discoveree information relating to one or more users associated with other UEs in the group of the discoverer UE, a discoverer information parameter that may be set to include upper layer discoverer information relating to a user associated with the discoverer UE, and a ProSe UE ID parameter that may be set to the ProSe UE ID of the discoverer UE. In various embodiments, the solicitation message by the discoverer UE may be broadcast, multicast, or groupcast. If another UE, acting as a discoveree UE, receives the solicitation message from the discoverer UE and determines that it is associated with one of the UEs related to the discoveree information, it may send a response message back to the discoverer UE with a type parameter set to response, a discovery-type parameter set to group member discovery, a discoveree information parameter that may be set to include upper layer discoveree information relating to a user associated with the UE sending the response message, and a ProSe UE ID parameter that may be set to the ProSe UE ID of the discoveree UE sending the response message. The response message may be unicast in some embodiments. If a UE, acting as a discoverer UE, receives a response message from a UE acting as a discoveree UE, the discoverer UE may determine that it can engage in D2D communication with the discoveree UE that sent the response message.

In various embodiments, the UE 304 may discover UE 306 at a block 308 with group member discovery using Model A or Model B. At a block 310, the UE 302 may discover both UE 304 and UE 306 with group member discovery using Model A or Model B. Having discovered both the UE 304 and the UE 306, the UE 302 may determine that it can act as a potential relay UE between the UE 304 and the UE 306. In various embodiments, the UEs 302, 304, and 306 may all be configured to be part of a public safety group. In some embodiments, the UE 302 may not be a part of the public safety group and may engage in a UE discovery process at the block 310 that allows the UE 302 to discover UE 304 and UE 306 even though UE 302 is not a part of the public safety group such that UE 304 and UE 306 may use UE 302 as a UE relay for D2D communication even though UE 302 is not a member of the group.

The UE 302 may send an announce message at a block 312, as a part of UE-to-UE relay discovery under Model A (Announce/Monitor). The announce message may include a type parameter set to announcement, a discovery-type parameter set to UE-to-UE relay discovery, an announcer information parameter that may be set to include upper layer information relating to a user associated with the UE 302 (e.g., an IMSI, MSIN or other information such as may be stored on a UICC in UE 302, for example), a ProsSe UE ID parameter that may be set to the ProSe UE ID of UE 302, and a list of upper layer remote user information parameters relating to users associated with the discovered UE 304 and the discovered UE 306. In some embodiments, the announce message may also include layer-2 identifiers of the discovered UE 304 and the discovered UE 306. The layer-2 identifiers may be MAC addresses in some embodiments and may be provided in association with the list of upper layer remote user information parameters in various embodiments. The announce message may be received by both the UE 304 and the UE 306 as they monitor for announcement messages.

The UE 304 may then communicate with the UE 306 in a D2D communication process 316 using a UE-to-UE relay having a first communication 318 to the UE 302 that is relayed by the UE 302 to the UE 306 in a second communication 320. In some embodiments, the D2D communication process 316 may be performed in a push-to-talk manner.

In various embodiments, an extended MAC header may be used, including fields for a relay layer-2 ID parameter that identifies the UE-to-UE relay and a direction parameter that indicates whether the MAC frame is being transmitted 'to the relay' or 'from the relay'. When UE 304 sends data to UE 306 via UE 302 in the first communication 318, the addressing identifiers in the MAC frame may be set with fields as follows: Source Layer-2 ID=ProSe UE ID (e.g., Layer-2 ID) of UE 304; Destination Layer-2 ID=ProSe UE ID (e.g., Layer-2 ID) of UE 306; Relay Layer-2 ID=ProSe UE ID (e.g., Layer-2 ID) of UE 302; and Direction='To Relay'.

When the UE 302 forwards the MAC frame to UE 306 in the second communication 320 by generating a relay MAC frame based at least in part on the MAC frame received from the UE 304, the addressing identifiers in the MAC frame may be set with fields as follows: Source Layer-2 ID=ProSe UE ID (e.g., Layer-2 ID) of UE 304; Destination Layer-2 ID=ProSe UE ID (e.g., Layer-2 ID) of UE 306; Relay Layer-2 ID=ProSe UE ID (e.g., Layer-2 ID) of UE 302; and Direction='From Relay'. In embodiments, the communication between the UE 304 and the UE 306 may be performed in a stateless manner. In various embodiments, the UE 304 may dynamically switch relay UEs on a frame by frame basis when communicating with the UE 306, which may increase performance by reducing packet flooding. The UE 304 may find another potential relay UE, and if the UE 302 moves out of range so that it can no longer act as a relay UE for communication between UE 304 and UE 306, the UE 304 may switch communication to the other potential relay UE.

In some embodiments, the UE-to-UE relay discovery and communication process 300 may include communication of internet protocol (IP) address information corresponding to UEs 302, 304, and 306, and UE 302 may provide layer-3 rather than layer-2 forwarding. The group member discovery procedure at the block 308 and the block 310 may be enhanced so that each message includes an assigned IP address of the UE sending the message, such as by including the IP address next to the ProSe UE ID of the UE in Group A announcement messages or Group B solicitation and response messages. Another approach for communicating the IP address may be used in some embodiments by using additional signaling messages that allow an interested UE (e.g., UE 304) to seek additional information from the relay UE (e.g., UE 302), which in turn may seek the information from the remote UE (e.g., UE 306), with the IP address information communicated back to the interested UE from the remote UE through the relay UE.

Figure 4:
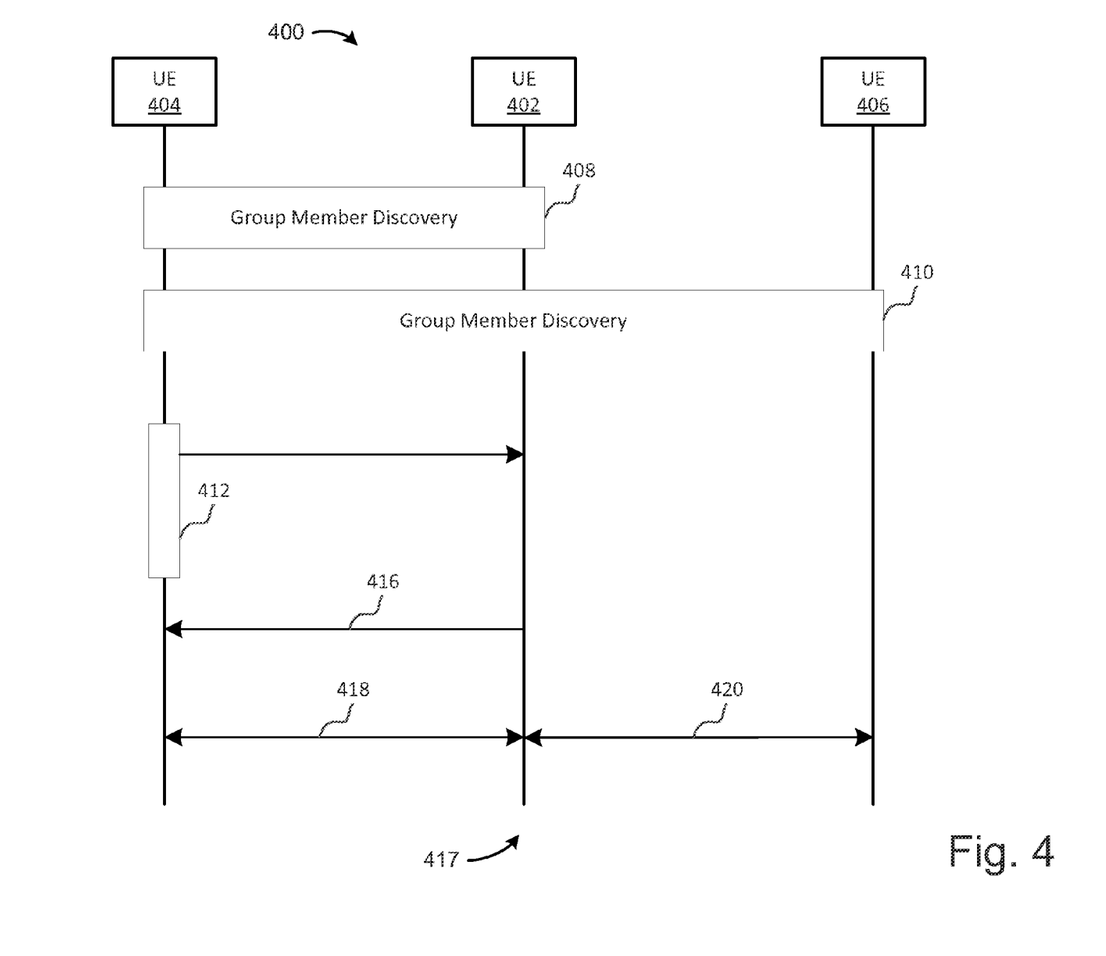
FIG. 4 is a diagram illustrating an example UE-to-UE relay discovery and communication process using Model B (Discoverer/Discoveree) in accordance with various embodiments.

FIG. 4 is a diagram illustrating an example UE-to-UE relay discovery and communication process 400 using Model B. In embodiments, before performing UE-to-UE relay discovery using Model B, a UE 402, a UE 404, and a UE 406 may each perform group member discovery using Model A or Model B as discussed above with respect to UEs 302, 304, and 306 in FIG. 3. In various embodiments, the UEs 402, 404, and 406 may be situated in a LTE network in similar fashion to that described for UEs 132, 134, and 136, respectively, of FIG. 1. The UEs 402, 404, and 406 may be configured as described with respect to UE 220 of FIG. 2. In various embodiments, the UE 404 may discover UE 402 at a block 408 with group member discovery using Model A or Model B. At a block 410, the UE 402 may discover both UE 404 and UE 406 with group member discovery using Model A or Model B. In various embodiments, the UEs 402, 404, and 406 may all be configured to be part of a public safety group. In some embodiments, the UE 402 may not be a part of the public safety group and may engage in a UE discovery process at the block 410 that allows the UE 402 to discover UE 404 and UE 406 even though UE 402 is not a part of the public safety group such that UE 404 and UE 406 may use UE 402 as a UE relay for D2D communication even though UE 402 is not a member of the group. Having discovered its neighboring UEs, the UE 404 may determine that a group member of interest (e.g., remote user, UE 406) is not within direct range.

The UE 404 may then, in the role of discoverer, solicit potential UE-to-UE relays by transmitting a solicitation message at a block 412 as a part of UE-to-UE relay discovery under Model B (Discoverer/Discoveree). The solicitation message may include a type parameter set to solicitation, a discovery-type parameter set to UE-to-UE relay discovery, a discoverer information parameter that may include upper layer user information associated with the UE 404 (e.g., an IMSI, MSIN or other information such as may be stored on a UICC in UE 404, for example), a ProSe UE ID parameter that may be set to the ProSe UE ID of UE 404 (e.g., a layer-2 identifier of UE 404), and a list of upper layer remote user information parameters for UEs of interest (e.g., user information for a user associated with the UE 406). In some embodiments, the solicitation message may include a layer-2 identifier for remote UEs of interest in addition to or instead of the list of upper layer remote user information parameters for UEs of interest. In some embodiments, one or more of the upper layer remote user information parameters may be referred to as a target information parameter.

Upon reception of the solicitation message, the UE 402 may determine (in the role of discoveree) that it can act as a UE-to-UE relay and may reply with a response message to the UE 404. The response message may include a type parameter set to response, a discovery-type parameter set to UE-to-UE relay discovery, a discoveree information parameter that may include upper layer discoveree user information that may be associated with a user of the UE 402, a ProSe UE ID parameter that may be set to a ProSe UE ID of the UE 402 (e.g., layer-2 identifier of the UE 402), and a list of upper layer user information parameters relating to users associated with UEs of interest (e.g., user information associated with UE 406). In some embodiments, the response message may also include layer-2 identifiers associated with the UEs of interest and may be provided in association with the corresponding upper layer user information.

Upon reception of the response message, the UE 404 may then communicate with the UE 406 in a D2D communication process 417 using a UE-to-UE relay having a first communication 418 to the UE 402 that is relayed by the UE 402 to the UE 406 in a second communication 420. In some embodiments, the D2D communication process 417 may be performed in a push-to-talk manner.

In various embodiments, an extended MAC header may be used, including fields for a relay layer-2 ID parameter that identifies the UE-to-UE relay and a direction parameter that indicates whether the MAC frame is being transmitted 'to the relay' or 'from the relay'. When UE 404 sends data to UE 406 via UE 402 in the first communication 418, the addressing identifiers in the MAC frame may be set with fields as follows: Source Layer-2 ID=ProSe UE ID (e.g., Layer-2 ID) of UE 404; Destination Layer-2 ID=ProSe UE ID (e.g., Layer-2 ID) of UE 406; Relay Layer-2 ID=ProSe UE ID (e.g., Layer-2 ID) of UE 402; and Direction='To Relay'.

When the UE 402 forwards the MAC frame to UE 406 in the second communication 420 by generating a relay MAC frame based at least in part on the MAC frame received from the UE 404, the addressing identifiers in the relay MAC frame may be set with fields as follows: Source Layer-2 ID=ProSe UE ID (e.g., Layer-2 ID) of UE 404; Destination Layer-2 ID=ProSe UE ID (e.g., Layer-2 ID) of UE 406; Relay Layer-2 ID=ProSe UE ID (e.g., Layer-2 ID) of UE 402; and Direction='From Relay'. In embodiments, the communication between the UE 404 and the UE 406 may be performed in a stateless manner. In various embodiments, the UE 404 may dynamically switch relay UEs on a frame by frame basis when communicating with the UE 406, which may increase performance by reducing packet flooding. The UE 404 may find another potential relay UE, and if the UE 402 moves out of range so that it can no longer act as a relay UE for communication between UE 404 and UE 406, the UE 404 may switch communication to the other potential relay UE.

In some embodiments, the UE-to-UE relay discovery and communication process 400 may include communication of IP address information corresponding to UEs 402, 404, and 406, and UE 402 may provide layer-3 rather than layer-2 forwarding. The group member discovery procedure at the block 408 and the block 410 may be enhanced so that each message includes an assigned IP address of the UE sending the message, such as by including the IP address next to the ProSe UE ID of the UE in Group A announcement messages or Group B solicitation and response messages. Another approach for communicating the IP address may be used in some embodiments by using additional signaling messages that allow an interested UE (e.g., UE 404) to seek additional information from the relay UE (e.g., UE 402), which in turn may seek the information from the remote UE (e.g., UE 406), with the IP address information communicated back to the interested UE from the remote UE through the relay UE.

The UE 220 or the eNB 210, as described in connection with FIG. 2, may be implemented into a system using any suitable hardware, firmware, and/or software configured as desired. FIG. 5 illustrates, for one embodiment, an example system 500 including radio frequency (RF) circuitry 504, baseband circuitry 508, application circuitry 512, memory/storage 516, display 520, camera 524, sensor 528, and input/output (I/O) interface 532, coupled with each other at least as shown.

The application circuitry 512 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 516 and configured to execute instructions stored in the memory/storage 516 to enable various applications and/or operating systems running on the system 500.

The baseband circuitry 508 may include circuitry such as, but not limited to, one or more single-core or multi-core processors. The processor(s) may include a baseband processor. The baseband circuitry 508 may include one or more digital signal processors (DSPs) in various embodiments. The baseband circuitry 508 may handle various radio control functions that enable communication with one or more radio networks via the RF circuitry 504. The radio control functions may include, but are not limited to, signal modulation, encoding, decoding, radio frequency shifting, etc. In some embodiments, the baseband circuitry 508 may provide for communication compatible with one or more radio technologies. For example, in some embodiments, the baseband circuitry 508 may support communication with an E-UTRAN and/or other WMAN, a WLAN, or a WPAN. Embodiments in which the baseband circuitry 508 is configured to support radio communications of more than one wireless protocol may be referred to as multi-mode baseband circuitry.

In various embodiments, baseband circuitry 508 may include circuitry to operate with signals that are not strictly considered as being in a baseband frequency. For example, in some embodiments, baseband circuitry 508 may include circuitry to operate with signals having an intermediate frequency, which is between a baseband frequency and a radio frequency.

In some embodiments, the processing circuitry 216 or 226 of FIG. 2 may be embodied in the application circuitry 512 and/or the baseband circuitry 508. In embodiments, the radio control circuitry 215 or 225 of FIG. 2 may be embodied in the baseband circuitry 508.

RF circuitry 504 may enable communication with wireless networks using modulated electromagnetic radiation through a non-solid medium. In various embodiments, the RF circuitry 504 may include switches, filters, amplifiers, etc., to facilitate the communication with the wireless network.

In various embodiments, RF circuitry 504 may include circuitry to operate with signals that are not strictly considered as being in a radio frequency. For example, in some embodiments, RF circuitry 504 may include circuitry to operate with signals having an intermediate frequency, which is between a baseband frequency and a radio frequency.

In some embodiments, the transceiver circuitry 214 or 224 of FIG. 2 may be embodied in the RF circuitry 504. In embodiments, the radio control circuitry 215 or 225 of FIG. 2 may be embodied in the RF circuitry 504.

In some embodiments, some or all of the constituent components of the baseband circuitry 508, the application circuitry 512, and/or the memory/storage 516 may be implemented together on a system on a chip (SOC).

Memory/storage 516 may be used to load and store data and/or instructions, for example, for system 500. Memory/storage 516 for one embodiment may include any combination of suitable volatile memory (e.g., dynamic random access memory (DRAM)) and/or non-volatile memory (e.g., Flash memory).

In various embodiments, the I/O interface 532 may include one or more user interfaces to enable user interaction with the system 500 and/or peripheral component interfaces to enable peripheral component interaction with the system 500. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 528 may include one or more sensing devices to determine environmental conditions and/or location information related to the system 500. In some embodiments, the sensors may include, but are not limited to, a gyro sensor, an accelerometer, a proximity sensor, an ambient light sensor, and a positioning unit. The positioning unit may also be part of, or interact with, the baseband circuitry 508 and/or RF circuitry 504 to communicate with components of a positioning network, e.g., a global positioning system (GPS) satellite.

In various embodiments, the display 520 may include a display, e.g., a liquid crystal display, a touch screen display, etc. In some embodiments, the camera 524 may include many molded plastic aspheric lens elements made with varying dispersion and refractive indexes. In some embodiments, the camera 524 may include two or more lenses to capture three-dimensional images for stereo photography.

In various embodiments, the system 500 may be a mobile computing device such as, but not limited to, a laptop computing device, a tablet computing device, a netbook, an ultrabook, a smartphone, etc. In various embodiments, system 500 may have more or fewer components, and/or different architectures.

Figure 6:
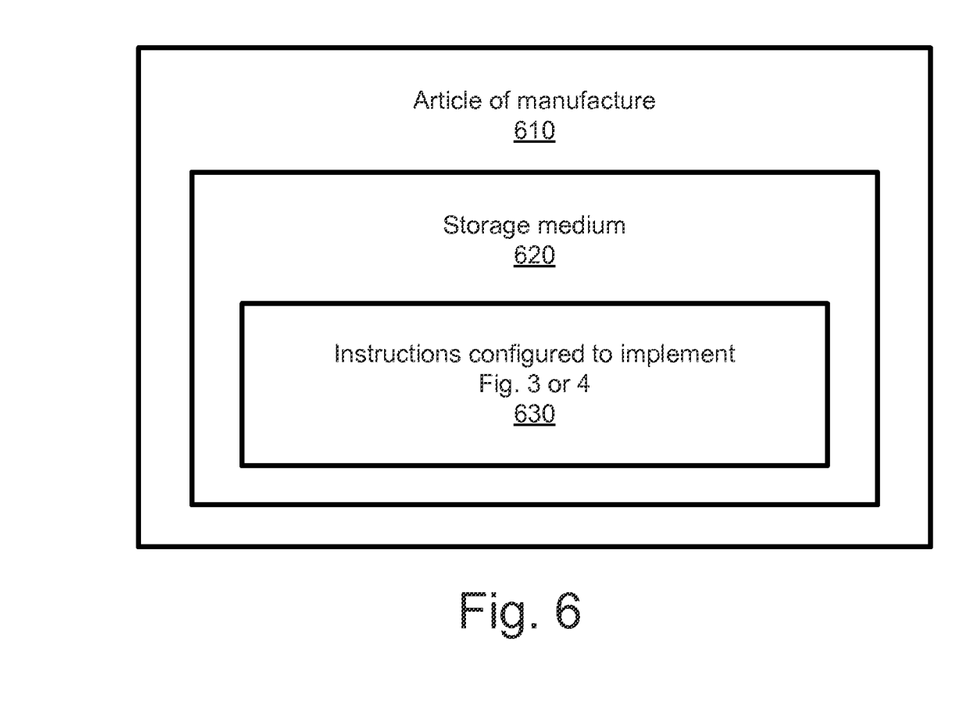
FIG. 6 illustrates an article of manufacture having programming instructions, incorporating aspects of the present disclosure, in accordance with various embodiments.

FIG. 6 illustrates an article of manufacture 610 having programming instructions, incorporating aspects of the present disclosure, in accordance with various embodiments. In various embodiments, an article of manufacture may be employed to implement various embodiments of the present disclosure. As shown, the article of manufacture 610 may include a computer-readable non-transitory storage medium 620 where instructions 630 may be configured to practice embodiments of or aspects of embodiments of any one of the processes described herein. The storage medium 620 may represent a broad range of persistent storage media known in the art, including but not limited to flash memory, dynamic random access memory, static random access memory, an optical disk, a magnetic disk, etc. In embodiments, computer-readable storage medium 620 may include one or more computer-readable non-transitory storage media. In other embodiments, computer-readable storage medium 620 may be transitory, such as signals, encoded with instructions 630.

In various embodiments, instructions 630 may enable an apparatus, in response to its execution by the apparatus, to perform various operations described herein. As an example, storage medium 620 may include instructions 630 configured to cause an apparatus, e.g., UE 220 in connection with FIG. 2, to practice some aspects of enabling public safety UE-to-UE relay discovery and/or communication, e.g., as illustrated in UE-to-UE relay discovery and communication process 300 of FIG. 3 or UE-to-UE relay discovery and communication process 400 of FIG. 4, in accordance with embodiments of the present disclosure.

The following paragraphs describe examples of various embodiments.

Example 1 may include an apparatus for wireless communication comprising: one or more storage media having instructions; and processing circuitry, coupled with the one or more storage media to execute the instructions to: determine a list of user equipments (UEs) with which the apparatus may communicate using device-to-device (D2D) communication; generate an announcement message that indicates the apparatus can serve as a relay based at least in part on the list; and generate a signal based at least in part on the announcement message and control transceiver circuitry to transmit the signal.

Example 2 may include the subject matter of Example 1, wherein the announcement message includes a list of UEs within D2D communication range.

Example 3 may include the subject matter of Example 2, wherein the announcement message includes a layer-2 identifier and a user information parameter associated with individual UEs in the list.

Example 4 may include the subject matter of any one of Examples 2-3, wherein the processing circuitry is further to generate a relay frame based at least in part on a frame received from a UE in the list of UEs.

Example 5 may include the subject matter of Example 4, wherein the frame received from the UE includes a source layer-2 ID field, a destination layer-2 ID field, a relay layer-2 ID field, and a direction field set to 'to relay'.

Example 6 may include the subject matter of Example 4, wherein the relay frame includes a source layer-2 ID field, a destination layer-2 ID field, a relay layer-2 ID field, and a direction field set to 'from relay'.

Example 7 may include a user equipment (UE) comprising: one or more storage media having instructions; and processing circuitry, coupled with the one or more storage media to execute the instructions to: determine a list of other UEs with which the UE may communicate using device-to-device (D2D) communication; generate a message having a discovery-type parameter set to UE-to-UE relay discovery and a parameter corresponding to another UE with which the UE may communicate using D2D communication; and generate a signal based at least in part on the message and to control transceiver circuitry to transmit the signal.

Example 8 may include the subject matter of Example 7, wherein the message is an announcement message.

Example 9 may include the subject matter of Example 7, wherein the message is a response message generated in response to a solicitation message received from a sending UE that is one of the other UEs with which the UE may communicate using D2D communication.

Example 10 may include the subject matter of Example 9, wherein the response message includes a remote user information parameter.

Example 11 may include the subject matter of Example 10, wherein the response message includes a remote UE layer-2 identifier associated with the remote user information parameter.

Example 12 may include the subject matter of Example 11, wherein the remote UE layer-2 identifier is associated with a UE in the list of other UEs with which the UE may communicate using D2D communication and the response message also includes a layer-2 identifier of the UE.

Example 13 may include the subject matter of any one of Examples 7-12, wherein the processing circuitry is further to generate a relay frame based at least in part on a frame received from a sending UE, wherein the sending UE is in the list of other UEs with which the UE may communicate using D2D communication.

Example 14 may include at least one computer-readable medium comprising instructions stored thereon that, in response to execution of the instructions by one or more processors of a user equipment (UE) cause the UE to: perform group member discovery to discover at least one other UE with which the UE may communicate using device-to-device (D2D) communication; and discover a potential relay UE for communication with a remote UE, wherein the potential relay UE is one of the at least one other UEs.

Example 15 may include the subject matter of Example 14, wherein the UE is caused to discover the potential relay UE based at least in part on receiving an announcement message from the potential relay UE.

Example 16 may include the subject matter of Example 15, wherein the announcement message includes an identifier corresponding to the potential relay UE and a remote user information parameter.

Example 17 may include the subject matter of Example 14, wherein the UE is further caused to send a solicitation message and the UE is caused to discover the potential relay UE based at least in part on receiving a response to the solicitation message from the potential relay UE.

Example 18 may include the subject matter of Example 17, wherein the solicitation message includes an identifier corresponding to the UE and a remote user information parameter.

Example 19 may include the subject matter of any one of Examples 17-18, wherein the solicitation message includes a plurality of remote user information parameters.

Example 20 may include the subject matter of any one of Examples 17-19, wherein the solicitation message includes a discovery-type parameter set to UE-to-UE relay discovery.

Example 21 may include the subject matter of any one of Examples 14-20, wherein the UE is further to send a device-to-device MAC frame to the potential relay UE, wherein the MAC frame includes a header with a direction field set to 'to relay'.

Example 22 may include at least one computer-readable medium comprising instructions stored thereon that, in response to execution of the instructions by one or more processors of a user equipment (UE) cause the UE to: perform group member discovery to discover a plurality of other UEs with which the UE may communicate using device-to-device (D2D) communication; and act as a relay UE for communication between a sending UE and a remote UE, wherein the sending UE and the remote UE are part of the discovered plurality of other UEs.

Example 23 may include the subject matter of Example 22, wherein the UE is to act as a relay UE by performing layer-2 forwarding.

Example 24 may include the subject matter of any one of Examples 22-23, wherein the UE is further caused to transmit an announcement message that includes a discovery-type parameter set to UE-to-UE relay discovery, wherein the UE is to act as a relay UE after transmission of the announcement message upon reception of an extended MAC header from the sending UE that includes a direction parameter indicating a MAC frame is being transmitted to a relay.

Example 25 may include the subject matter of any one of Examples 22-24, wherein the UE is further caused to transmit a response message in response to reception of a solicitation message from another UE that includes a remote user information parameter corresponding to a user associated with one of the discovered plurality of other UEs, wherein the UE is to act as a relay UE after transmission of the response message upon reception of an extended MAC header from the sending UE that includes a direction parameter indicating a MAC frame is being transmitted to a relay.

Example 26 may include a method of wireless communication comprising: determining a list of user equipments (UEs) with which an apparatus may communicate using device-to-device (D2D) communication; generating an announcement message that indicates the apparatus can serve as a relay based at least in part on the list; generating a signal based at least in part on the announcement message; and controlling transceiver circuitry to transmit the signal.

Example 27 may include the subject matter of Example 26, wherein the announcement message includes a list of UEs within D2D communication range.

Example 28 may include the subject matter of Example 27, wherein the announcement message includes a layer-2 identifier and a user information parameter associated with individual UEs in the list.

Example 29 may include the subject matter of any one of Examples 27-28, further comprising generating a relay frame based at least in part on a frame received from a UE in the list of UEs.

Example 30 may include the subject matter of Example 29, wherein the frame received from the UE includes a source layer-2 ID field, a destination layer-2 ID field, a relay layer-2 ID field, and a direction field set to 'to relay'.

Example 31 may include the subject matter of Example 29, wherein the relay frame includes a source layer-2 ID field, a destination layer-2 ID field, a relay layer-2 ID field, and a direction field set to 'from relay'.

Example 32 may include a method of communicating with a user equipment (UE) comprising: determining a list of other UEs with which the UE may communicate using device-to-device (D2D) communication; generating a message having a discovery-type parameter set to UE-to-UE relay discovery and a parameter corresponding to another UE with which the UE may communicate using D2D communication; generating a signal based at least in part on the message; and controlling transceiver circuitry to transmit the signal.

Example 33 may include the subject matter of Example 32, wherein the message is an announcement message.

Example 34 may include the subject matter of Example 32, wherein the message is a response message generated in response to a solicitation message received from a sending UE that is one of the other UEs with which the UE may communicate using D2D communication.

Example 35 may include the subject matter of Example 34, wherein the response message includes a remote user information parameter.

Example 36 may include the subject matter of Example 35, wherein the response message includes a remote UE layer-2 identifier associated with the remote user information parameter.

Example 37 may include the subject matter of Example 36, wherein the remote UE layer-2 identifier is associated with a UE in the list of other UEs with which the UE may communicate using D2D communication and the response message also includes a layer-2 identifier of the UE.

Example 38 may include the subject matter of any one of Examples 32-37, further comprising generating a relay frame based at least in part on a frame received from a sending UE, wherein the sending UE is in the list of other UEs with which the UE may communicate using D2D communication.

Example 39 may include a method of wireless communication comprising: performing group member discovery to discover at least one other UE with which a UE may communicate using device-to-device (D2D) communication; and discovering a potential relay UE for communication with a remote UE, wherein the potential relay UE is one of the at least one other UEs.

Example 40 may include the subject matter of Example 39, wherein discovering the potential relay UE is based at least in part on receiving an announcement message from the potential relay UE.

Example 41 may include the subject matter of Example 40, wherein the announcement message includes an identifier corresponding to the potential relay UE and a remote user information parameter.

Example 42 may include the subject matter of Example 39, further comprising sending a solicitation message, wherein discovering the potential relay UE is based at least in part on receiving a response to the solicitation message from the potential relay UE.

Example 43 may include an apparatus for wireless communication comprising: means for determining a list of user equipments (UEs) with which an apparatus may communicate using device-to-device (D2D) communication; means for generating an announcement message that indicates the apparatus can serve as a relay based at least in part on the list; means for generating a signal based at least in part on the announcement message; and means for controlling transceiver circuitry to transmit the signal.

Example 44 may include the subject matter of Example 43, wherein the announcement message includes a list of UEs within D2D communication range.

Example 45 may include the subject matter of Example 44, wherein the announcement message includes a layer-2 identifier and a user information parameter associated with individual UEs in the list.

Example 46 may include the subject matter of any one of Examples 44-45, further comprising means for generating a relay frame based at least in part on a frame received from a UE in the list of UEs.

Example 47 may include the subject matter of Example 46, wherein the frame received from the UE includes a source layer-2 ID field, a destination layer-2 ID field, a relay layer-2 ID field, and a direction field set to 'to relay'.

Example 48 may include the subject matter of Example 46, wherein the relay frame includes a source layer-2 ID field, a destination layer-2 ID field, a relay layer-2 ID field, and a direction field set to 'from relay'.

Example 49 may include a user equipment (UE) comprising: means for determining a list of other UEs with which the UE may communicate using device-to-device (D2D) communication; means for generating a message having a discovery-type parameter set to UE-to-UE relay discovery and a parameter corresponding to another UE with which the UE may communicate using D2D communication; means for generating a signal based at least in part on the message; and means for controlling transceiver circuitry to transmit the signal.

Example 50 may include the subject matter of Example 49, wherein the message is an announcement message.

Example 51 may include the subject matter of Example 49, wherein the message is a response message generated in response to a solicitation message received from a sending UE that is one of the other UEs with which the UE may communicate using D2D communication.

Example 52 may include the subject matter of Example 51, wherein the response message includes a remote user information parameter.

Example 53 may include the subject matter of Example 52, wherein the response message includes a remote UE layer-2 identifier associated with the remote user information parameter.

Example 54 may include the subject matter of Example 53, wherein the remote UE layer-2 identifier is associated with a UE in the list of other UEs with which the UE may communicate using D2D communication and the response message also includes a layer-2 identifier of the UE.

Example 55 may include the subject matter of any one of Examples 49-54, further comprising means for generating a relay frame based at least in part on a frame received from a sending UE, wherein the sending UE is in the list of other UEs with which the UE may communicate using D2D communication.

Example 56 may include an apparatus for wireless communication comprising: means for performing group member discovery to discover at least one other UE with which a UE may communicate using device-to-device (D2D) communication; and means for discovering a potential relay UE for communication with a remote UE, wherein the potential relay UE is one of the at least one other UEs.

Example 57 may include the subject matter of Example 56, wherein the means for discovering the potential relay UE is to discover the potential relay UE based at least in part on receiving an announcement message from the potential relay UE.

Example 58 may include the subject matter of Example 57, wherein the announcement message includes an identifier corresponding to the potential relay UE and a remote user information parameter.

Example 59 may include the subject matter of Example 56, further comprising sending a solicitation message, wherein discovering the potential relay UE is based at least in part on receiving a response to the solicitation message from the potential relay UE.

Example 60 may include a system comprising: one or more storage media having instructions; and processing circuitry, coupled with the one or more storage media to execute the instructions to: determine a list of other UEs with which a UE may communicate using device-to-device (D2D) communication; generate a message having a discovery-type parameter set to UE-to-UE relay discovery and a parameter corresponding to another UE with which the UE may communicate using D2D communication; and generate a signal based at least in part on the message and to control transceiver circuitry to transmit the signal.

Example 61 may include the subject matter of Example 60, wherein the message is an announcement message.

Example 62 may include the subject matter of Example 60, wherein the message is a response message generated in response to a solicitation message received from a sending UE that is one of the other UEs with which the UE may communicate using D2D communication.

Example 63 may include the subject matter of Example 62, wherein the response message includes a remote user information parameter.

Example 64 may include the subject matter of Example 63, wherein the response message includes a remote UE layer-2 identifier associated with the remote user information parameter.

Example 65 may include the subject matter of Example 64, wherein the remote UE layer-2 identifier is associated with a UE in the list of other UEs with which the UE may communicate using D2D communication and the response message also includes a layer-2 identifier of the UE.

Example 66 may include the subject matter of any one of Examples 60-65, wherein the processing circuitry is further to generate a relay frame based at least in part on a frame received from a sending UE, wherein the sending UE is in the list of other UEs with which the UE may communicate using D2D communication.

Example 67 may include one or more non-transitory computer-readable media comprising instructions to cause an electronic device, upon execution of the instructions by one or more processors of the electronic device, to perform one or more elements of a method or process related to or described with respect to any of Examples 26-66, or any other method or process described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate and/or equivalent embodiments or implementations calculated to achieve the same purposes may be made in light of the above detailed description, without departing from the scope of the present disclosure, as those skilled in the relevant art will recognize.

What is claimed is:

1. An apparatus for wireless communication comprising:
one or more storage media having instructions; and
processing circuitry, coupled with the one or more storage media to execute the instructions to:
determine a list of user equipments (UEs) with which the apparatus may communicate using device-to-device (D2D) communication;
generate an announcement message that indicates the apparatus can serve as a relay based at least in part on the list; and
generate a signal based at least in part on the announcement message and control transceiver circuitry to transmit the signal.

2. The apparatus of claim 1, wherein the announcement message includes a list of UEs within D2D communication range.

3. The apparatus of claim 2, wherein the announcement message includes a layer-2 identifier and a user information parameter associated with individual UEs in the list.

4. The apparatus of claim 2, wherein the processing circuitry is further to generate a relay frame based at least in part on a frame received from a UE in the list of UEs.

5. The apparatus of claim 4, wherein the frame received from the UE includes a source layer-2 ID field, a destination layer-2 ID field, a relay layer-2 ID field, and a direction field set to 'to relay'.

6. The apparatus of claim 4, wherein the relay frame includes a source layer-2 ID field, a destination layer-2 ID field, a relay layer-2 ID field, and a direction field set to 'from relay'.

7. A user equipment (UE) comprising:
one or more storage media having instructions; and
processing circuitry, coupled with the one or more storage media to execute the instructions to:
determine a list of other UEs with which the UE may communicate using device-to-device (D2D) communication;
generate a message having a discovery-type parameter set to UE-to-UE relay discovery and a parameter corresponding to another UE with which the UE may communicate using D2D communication; and
generate a signal based at least in part on the message and to control transceiver circuitry to transmit the signal.

8. The UE of claim 7, wherein the message is an announcement message.

9. The UE of claim 7, wherein the message is a response message generated in response to a solicitation message received from a sending UE that is one of the other UEs with which the UE may communicate using D2D communication.

10. The UE of claim 9, wherein the response message includes a remote user information parameter.

11. The UE of claim 10, wherein the response message includes a remote UE layer-2 identifier associated with the remote user information parameter.

12. The UE of claim 11, wherein the remote UE layer-2 identifier is associated with a UE in the list of other UEs with which the UE may communicate using D2D communication and the response message also includes a layer-2 identifier of the UE.

13. The UE of claim 7, wherein the processing circuitry is further to generate a relay frame based at least in part on a frame received from a sending UE, wherein the sending UE is in the list of other UEs with which the UE may communicate using D2D communication.

14. At least one non-transitory computer-readable medium comprising instructions stored thereon that, in response to execution of the instructions by one or more processors of a user equipment (UE) cause the UE to:
perform group member discovery to discover at least one other UE with which the UE may communicate using device-to-device (D2D) communication; and
discover a potential relay UE for communication with a remote UE, wherein the potential relay UE is one of the at least one other UEs, wherein the UE is further to send a device-to-device medium access control (MAC) frame to the potential relay UE, wherein the MAC frame includes a header with a direction field set to 'to relay'.

15. The at least one non-transitory computer-readable medium of claim 14, wherein the UE is caused to discover the potential relay UE based at least in part on receiving an announcement message from the potential relay UE.

16. The at least one non-transitory computer-readable medium of claim 15, wherein the announcement message includes an identifier corresponding to the potential relay UE and a remote user information parameter.

17. The at least one non-transitory computer-readable medium of claim 14, wherein the UE is further caused to send a solicitation message and the UE is caused to discover the potential relay UE based at least in part on receiving a response to the solicitation message from the potential relay UE.

18. The at least one non-transitory computer-readable medium of claim 17, wherein the solicitation message includes an identifier corresponding to the UE and a remote user information parameter.

19. The at least one non-transitory computer-readable medium of claim 18, wherein the solicitation message includes a plurality of remote user information parameters.

20. The at least one non-transitory computer-readable medium of claim 19, wherein the solicitation message includes a discovery-type parameter set to UE-to-UE relay discovery.

21. At least one non-transitory computer-readable medium comprising instructions stored thereon that, in response to execution of the instructions by one or more processors of a user equipment (UE) cause the UE to:
perform group member discovery to discover a plurality of other UEs with which the UE may communicate using device-to-device (D2D) communication;
generate an announcement message that indicates the UE can serve as a relay based at least in part on the group member discovery; and
act as a relay UE for communication between a sending UE and a remote UE, wherein the sending UE and the remote UE are part of the discovered plurality of other UEs.

22. The at least one non-transitory computer-readable medium of claim 21, wherein the UE is to act as a relay UE by performing layer-2 forwarding.

23. The at least one non-transitory computer-readable medium of claim 22, wherein the UE is further caused to transmit the announcement message, wherein the announcement message includes a discovery-type parameter set to UE-to-UE relay discovery, and wherein the UE is to act as a relay UE after transmission of the announcement message upon reception of an extended medium access control (MAC) header from the sending UE that includes a direction parameter indicating a MAC frame is being transmitted to a relay.

24. The at least one non-transitory computer-readable medium of claim 21, wherein the UE is further caused to transmit a response message in response to reception of a solicitation message from another UE that includes a remote user information parameter corresponding to a user associated with one of the discovered plurality of other UEs, wherein the UE is to act as a relay UE after transmission of the response message upon reception of an extended medium access control (MAC) header from the sending UE that includes a direction parameter indicating a MAC frame is being transmitted to a relay.

* * * * *